US012679170B2

(12) United States Patent
Kim et al.

(10) Patent No.: US 12,679,170 B2
(45) Date of Patent: Jul. 14, 2026

(54) METHOD FOR CONTROLLING VEHICLE AIR- CONDITIONING SYSTEM AND A COMPRESSOR TO WHICH THE METHOD IS APPLIED

(71) Applicant: Hanon Systems, Daejeon (KR)

(72) Inventors: Hong Min Kim, Daejeon (KR); Gu Hyun Ryu, Daejeon (KR); Jeong Hyeon Kim, Daejeon (KR); Soo Cheol Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/294,082

(22) PCT Filed: Nov. 29, 2022

(86) PCT No.: PCT/KR2022/019113
§ 371 (c)(1),
(2) Date: Jan. 31, 2024

(87) PCT Pub. No.: WO2023/113301
PCT Pub. Date: Jun. 22, 2023

(65) Prior Publication Data
US 2025/0269699 A1 Aug. 28, 2025

(30) Foreign Application Priority Data
Dec. 14, 2021 (KR) ........................ 10-2021-0178935

(51) Int. Cl.
B60H 1/00 (2006.01)
B60H 1/32 (2006.01)

(52) U.S. Cl.
CPC ....... B60H 1/00807 (2013.01); B60H 1/3225 (2013.01); B60H 2001/325 (2013.01); B60H 2001/3263 (2013.01)

(58) Field of Classification Search
CPC .............. F25B 2500/222; F25B 49/005; F25B 2500/19; F25B 49/02; B60H 1/00807;
(Continued)

(56) References Cited

U.S. PATENT DOCUMENTS 5,457,965 A * 10/1995 Blair ...................... G01F 23/14
62/228.3
5,678,418 A * 10/1997 Ueno ................. B60H 1/00878
62/200
(Continued)

FOREIGN PATENT DOCUMENTS

JP H06194014 A 7/1994
JP 2002364951 A 12/2002
(Continued)

OTHER PUBLICATIONS

JP 2016-161244 translation Published 2016.*

*Primary Examiner* — Henry T Crenshaw
(74) *Attorney, Agent, or Firm* — Shumaker, Loop & Kendrick, LLP; James D. Miller

(57) ABSTRACT
Disclosed is a method for controlling a vehicle air-conditioning system and a compressor to which the method for controlling a vehicle air-conditioning system is applied. The embodiments of the present disclosure may precisely sense changes in the refrigerant amount of a mechanical or an electrical compressor, thereby making it possible to stably operate the compressor.

9 Claims, 6 Drawing Sheets

(58) Field of Classification Search
CPC .......... B60H 1/3225; B60H 1/00; B60H 1/32;
B60H 2001/325; B60H 2001/3263
See application file for complete search history.

(56)                    References Cited

U.S. PATENT DOCUMENTS

2008/0048045 A1*    2/2008  Butler ..................... F24F 11/42
                                                              236/93 R
2012/0280816 A1*   11/2012  Gado ................... F25B 49/005
                                                              340/614
2013/0285822 A1*   10/2013  Gado ................... G08B 21/182
                                                              340/614
2014/0174114 A1*    6/2014  Tamaki ................. F25B 45/00
                                                              62/129

FOREIGN PATENT DOCUMENTS

JP           2016-161244      *   9/2016
JP           2016161244  A       9/2016
JP           2018179488  A      11/2018

* cited by examiner

METHOD FOR CONTROLLING VEHICLE AIR- CONDITIONING SYSTEM AND A COMPRESSOR TO WHICH THE METHOD IS APPLIED

CROSS REFERENCE TO RELATED PATENT APPLICATIONS

This is a U.S. national phase patent application of PCT/KR2022/019113 filed Nov. 29, 2022 which claims the benefit of and priority to Korean Patent Application No. 10-2021-0178935, filed on Dec. 14, 2021, the entire contents of each of which are incorporated herein by reference.

TECHNICAL FIELD

The present disclosure relates to precise determination of a refrigerant amount of a compressor, more particularly, a method for controlling a vehicle air-conditioning system and a compressor to which the method is applied.

BACKGROUND ART

In general, an air-conditioning system is installed in a vehicle, and the air-conditioning system includes a cooling system for cooling a vehicle interior, a heating system for heating a vehicle interior, a full automatic temperature controller (FATC), and a heating, ventilation, and air conditioning (HVAC) for adjusting a temperature/intensity/direction of air introduced into the vehicle interior.

The air-conditioning system provided in a vehicle is installed for the purpose of cooling or heating the vehicle interior during a summer or a winter, and securing a visual field of a driver in forward and rearward directions by removing humidity generated inside a wind shield glass when it rains or during a winter.

The air-conditioning system has both a heating system and a cooling system, and cools, heats, or vents the vehicle interior by blowing outside air after introducing the outside air or the inside air selectively thereinto and heating or cooling the air.

The cooling system cools the vehicle interior by discharging heat in the vehicle interior to the outside through the refrigerant while circulating the refrigerant, which is a heat exchange medium, according to a general cooling cycle.

The cooling system of the air-conditioning system includes a compressor 1 for compressing the refrigerant, a condenser 2 for condensing the refrigerant compressed in the compressor 1, an expansion valve 3 for rapidly expanding the refrigerant that has been condensed and liquified in the condenser 2, and an evaporator 4 for cooling the air to be blown to the vehicle interior using heat of vaporization of the refrigerant while evaporating the refrigerant that has been expanded in the expansion valve 3.

The compressor 1 compresses a low-temperature low-pressure refrigerant by power of an engine and discharges it to the condenser 2, and the condenser 2 condenses a high-temperature high-pressure refrigerant by the compressor 1 using blown air from a cooling fan (not shown) to turn the refrigerant into a middle-temperature high-pressure liquid.

The refrigerant in a middle-temperature high-pressure state came out from the condenser 2 is rapidly expanded by the expansion valve 3, and conveyed to the evaporator 4 in a low-temperature low-pressure, wet, saturated, and gaseous state.

In the evaporator, the refrigerant is evaporated by a heat exchange with an outside air after the expansion, with a phase thereof changed into a gaseous state, and is moved to the compressor 1. In this case, since a blower fan (not shown) introduces air on the inside and outside the vehicle and blows the air into the vehicle interior through the evaporator 4, the blown air is introduced into the vehicle interior after being cooled by heat of vaporization of the liquid refrigerant in the evaporator 4, thereby cooling the vehicle interior.

The expansion valve 3 is configured to turn a liquid refrigerant into a low-temperature low-pressure, wet and saturated gaseous state by a throttle action, in addition to adjusting a flow rate of the refrigerant according to an opening degree, the expansion valve 3 may turn the refrigerant introduced into the compressor 1 into an overheated vaporous state, or may make the refrigerant to include a part of the liquid refrigerant by directly influencing an overheat degree of the refrigerant at an outlet of the evaporator 4.

The expansion valve 3 serves to adjust a flow rate of the refrigerant to be appropriate by making the opening degree be changed properly by means of an opening degree control means according to a heat load variation of the evaporator 4, and to maintain an overheat degree to be constant, so that the cooling system can exert its best performance.

The heating system includes a pump, a heater core, and an engine. The engine heats a coolant, and the heater core conveys heat of an introduced coolant, which has been heated in the engine, to ambient air. The ambient air heated through heat exchange with the coolant at the heater core is supplied to the vehicle interior to heat the vehicle interior.

The full automatic temperature controller (FATC) calculates a target evaporator temperature using air-conditioning conditions received from a control panel equipped in a center fascia panel in front of a driver's seat. In addition, the FATC compares an evaporator temperature received from an evaporator sensor embedded in the air-conditioning system and the target evaporator temperature so as to control the compressor.

For example, when the evaporator temperature is lower than the target evaporator temperature, the FATC decreases the rpm (revolutions per minute) (or duty) of the compressor, and when the evaporator temperature is higher than the target evaporator temperature, the FATC increases the rpm (or duty) of the compressor.

As such, in the air-conditioning device in the air-conditioning system according to the prior art, it was possible to check a leak or insufficiency of the refrigerant only when an amount of the refrigerant leak accounts for 90% or more of the entire amount of the refrigerant.

In such a case, there was a problem in that the refrigerant inside the compressor excessively leaked, which was a possible cause of damage to components.

Therefore, there was a need for methods allowing to check leakage defects in advance before the compressor is damaged.

SUMMARY

The present embodiments aims to provide a method for controlling vehicle air-conditioning system capable of precisely sensing a slight change in the refrigerant amount of the compressor and allowing to check defects in advance before the compressor is damaged due to insufficiency of the refrigerant, and a compressor to which the method is applied.

One embodiment is a method for controlling a vehicle air-conditioning system according to a first embodiment of the present disclosure, including: a first step (ST10) for performing a state measurement to determine a refrigerant amount state of a compressor provided in an air-conditioning system after a vehicle is turned on; a second step (ST20) for allowing switching to a refrigerant amount determination mode after the first step; a third step (ST30) for allowing waiting for 1 hour after the second step; a fourth step (ST40) for determining whether an evaporator provided in the air-conditioning system meets a target evaporator temperature Evap T after the third step; and a fifth step (ST50) for determining whether a predetermined target deviation temperature per outside air temperature is met after the fourth step, and whether the refrigerant amount of the compressor is normal may be determined through the fourth step or the fifth step.

The first step (ST10) may further include: outside air temperature sensing step (ST11) for sensing a temperature state of outside air of the vehicle; evaporator temperature sensing step (ST12) for sensing a temperature state of the evaporator; and duct inside temperature sensing step (ST13) for sensing a temperature state of an inside of a duct positioned at an outlet side of the evaporator.

The first step (ST10) may further include: discharge pressure sensing step (ST14) for sensing a discharge pressure of the compressor.

The second step (ST20) may include: on-state maintaining step (ST21) for maintaining the air-conditioning system in an on state while maintaining the vehicle in an idle state; outside air mode operating step (ST22) for operating the air-conditioning system in an outside air mode; lowest temperature operating step (ST23) for operating the air-conditioning system at a lowest temperature; and blower fan operating step (ST24) for operating a blower fan provided in the air-conditioning system to generate a maximum amount of air flow.

The 1 hour of the third step (ST30) may correspond to a time taken for stabilizing operation of the compressor to have a refrigerant amount in a normal state.

The target evaporator temperature Evap T of the fourth step (ST40) is a temperature at which thermal equilibrium is achieved as a result of a heat exchange with an outside air by the evaporator.

When the target evaporator temperature Evap T is lower than an outside air temperature, it may be determined that a refrigerant amount is normal.

In the fifth step (ST50), when a temperature value obtained by deducting the target evaporator temperature Evap T from an inside temperature of a duct Duct T positioned at an outlet side of the evaporator is maintained in a range of the target deviation temperature per outside air temperature, it may be determined that a refrigerant amount is normal.

The method may further include: determining whether a discharge pressure meets a value in a range of a discharge pressure per outside air temperature (ST60) after the fifth step (ST50).

In the determining whether a discharge pressure meets a value in a range of a discharge pressure per outside air temperature (ST60), when the discharge pressure is maintained in a range of first to second target discharge pressures, it may be determined that a refrigerant amount is normal.

When the fourth to the fifth steps (ST40 and ST50) are both met, it may be determined that a current refrigerant amount of the compressor is normal.

There provided a mechanical compressor to which the method for controlling a vehicle air-conditioning system according to the first embodiment is applied.

Another embodiment is a method for controlling a vehicle air-conditioning system according to a second embodiment of the present disclosure, including: a first step (ST100) for performing a state measurement to determine a refrigerant amount state of a compressor provided in an air-conditioning system after a vehicle is turned on; a second step (ST200) for allowing switching to a refrigerant amount determination mode after the first step (ST100); a third step (ST300) for allowing waiting for 1 hour after the second step (ST200); a fourth step (ST400) for determining whether an evaporator provided in the air-conditioning system meets a target evaporator temperature Evap T after the third step (ST300); a fifth step (ST500) for determining whether a predetermined target deviation temperature per outside air temperature is met after the fourth step (ST400); a sixth step (ST600) for determining whether a discharge pressure meets a target discharge pressure value per outside air temperature after the fifth step (ST500); and a seventh step (ST700) for determining whether a rpm (revolutions per minute) of the compressor meets a value in an expected range of rpm per outside air temperature after the sixth step (ST600), and whether the refrigerant amount of the compressor is normal may be determined through the fourth step (ST400), the fifth step (ST500), the sixth step (ST600), or the seventh step (ST700).

When the fourth to the seventh steps (ST400, ST500, ST600, ST700) are all met, it may be determined that a current refrigerant amount of the compressor is normal.

The first step (ST100) may further include: outside air temperature sensing step (ST110) for sensing a temperature state of outside air of the vehicle; evaporator temperature sensing step (ST120) for sensing a temperature state of the evaporator; duct inside temperature sensing step (ST130) for sensing a temperature state of an inside of a duct positioned at an outlet side of the evaporator; discharge pressure sensing step (ST140) for sensing a discharge pressure state of the compressor; and rpm sensing step (ST150) for sensing a rpm of the compressor.

In the seventh step (ST700), when a rpm of the compressor meets first to second expected rpm, it may be determined that the refrigerant amount is normal.

It is possible to use the method to a mechanical compressor to which the method for controlling a vehicle air-conditioning system according to the second embodiment is applied.

Still another embodiment is a compressor for a vehicle according to a third embodiment, including: a sensing unit (100) configured to sense whether a refrigerant of a compressor provided in a vehicle air-conditioning system is maintained to be normal; a memory unit (200) configured to receive and store information sensed by the sensing unit; a control unit (300) configured to determine whether a current refrigerant amount of the compressor is normal or abnormal by switching the air-conditioning system to a refrigerant amount determination mode in association with the memory unit; and a display unit (400) configured to display that a refrigerant amount of the compressor is abnormal in association with the control unit when a refrigerant amount of the compressor is abnormal.

The sensing unit (100) may include: a first sensing unit (110) configured to sense an outside air temperature of the vehicle; a second sensing unit (120) configured to sense a temperature of an evaporator; a third sensing unit (130) configured to sense an inside temperature of a duct positioned at an outlet side of the evaporator; a fourth sensing unit (140) configured to sense a discharge pressure of the compressor; a fifth sensing unit (150) configured to sense a rpm of the compressor; and a sixth sensing unit (160) configured to sense relative humidity outside the vehicle.

The present embodiments may precisely sense the refrigerant amount of the compressor so as to prevent any problem causing damage and failure of an expensive compressor in advance, thereby improving the safety.

The present embodiments may precisely determine a slight amount of refrigerant leakage through various measurement conditions and determination conditions when determining the refrigerant amount of the compressor, thereby stabilizing the quality.

DESCRIPTION OF AN EMBODIMENT

Figure 1:
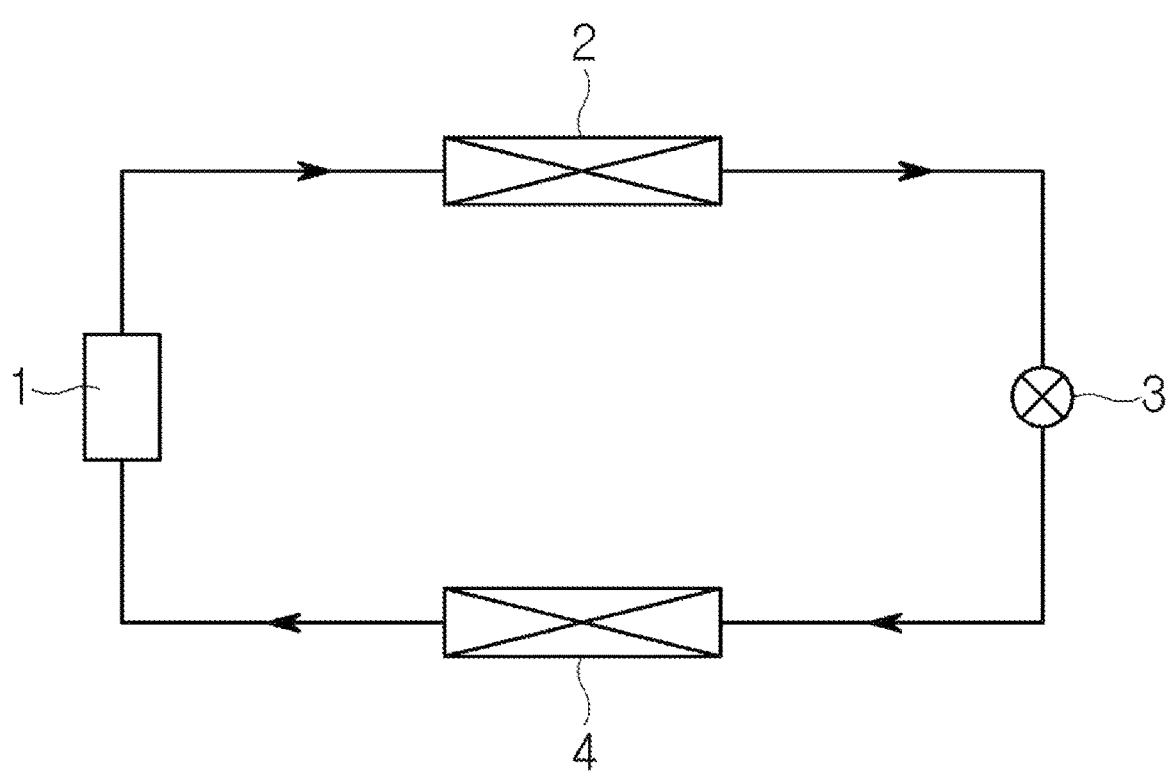
FIG. 1 is a view skeptically illustrating a cooling system of a conventional air-conditioning system.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims. Like reference numerals generally denote like elements throughout the specification.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts, or any combination thereof which are mentioned in the specification, and intended not to exclude the existence or addition of at least one another characteristics, numbers, steps, operations, components, parts, or any combination thereof.

While terms such as the first and the second, etc., can be used to describe various components, the components are not limited by the terms mentioned above. The terms are used only for distinguishing between one component and other components.

Hereinafter, a method for controlling a vehicle air-conditioning system according to the first embodiment of the present disclosure will be described with reference to the accompanying drawings. In particular, the embodiment aims to operate the air-conditioning system in a stable manner by providing a logic capable of precisely determining a refrigerant amount state of the compressor and checking damage due to insufficiency of the refrigerant amount in advance.

In particular, the present embodiment may precisely determine a state of slight insufficiency of a refrigerant amount which accounts for 10% or less of the entire refrigerant amount of the compressor, or a state lack of the refrigerant amount by more than 10%. Therefore, it is possible to control a failure due to the refrigerant amount insufficiency of a compressor and damage caused by the insufficiency in advance safely.

Figure 2:
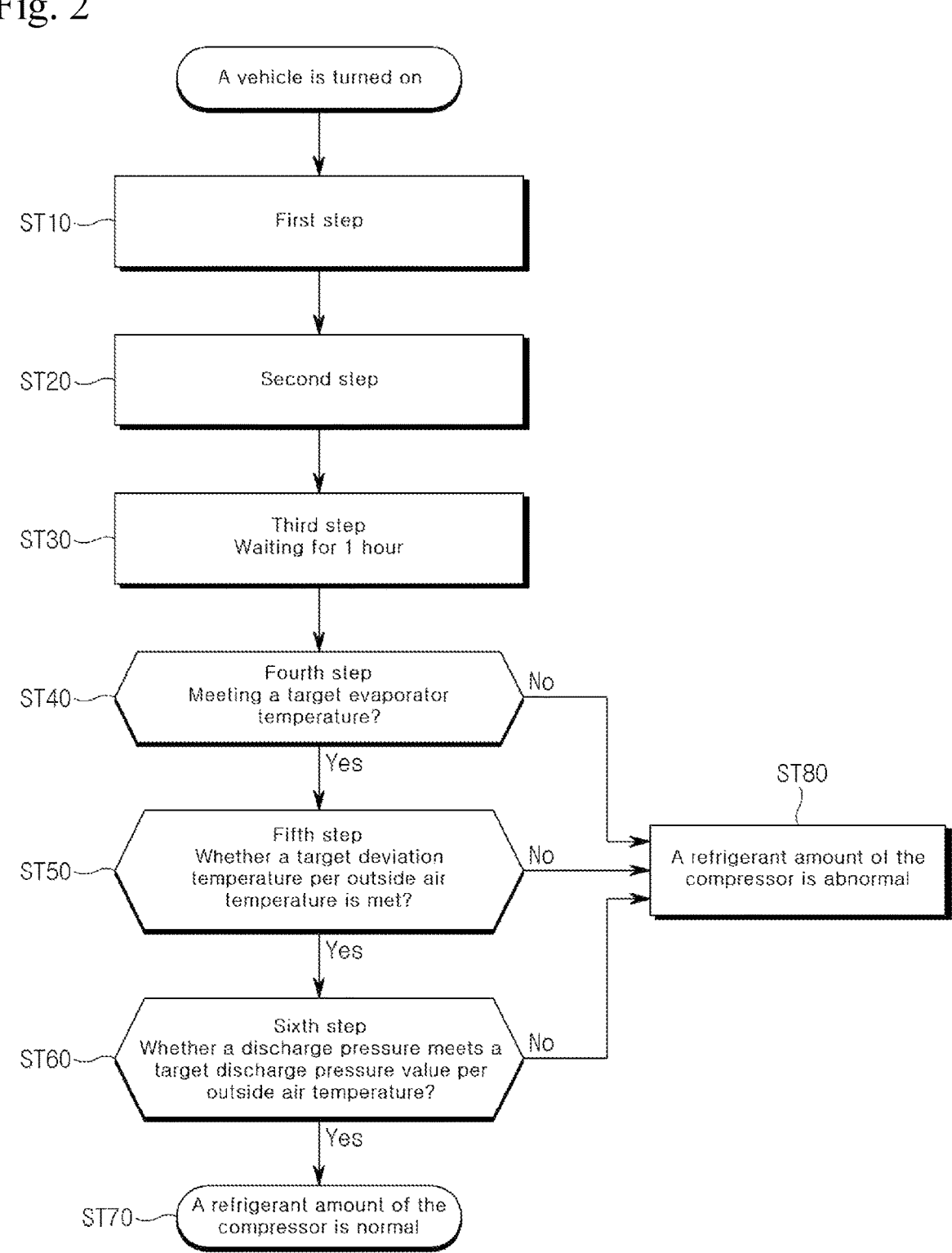
FIG. 2 is a flowchart illustrating a method for controlling a method for controlling a vehicle air-conditioning system according to a first embodiment of the present disclosure.
Figure 3:
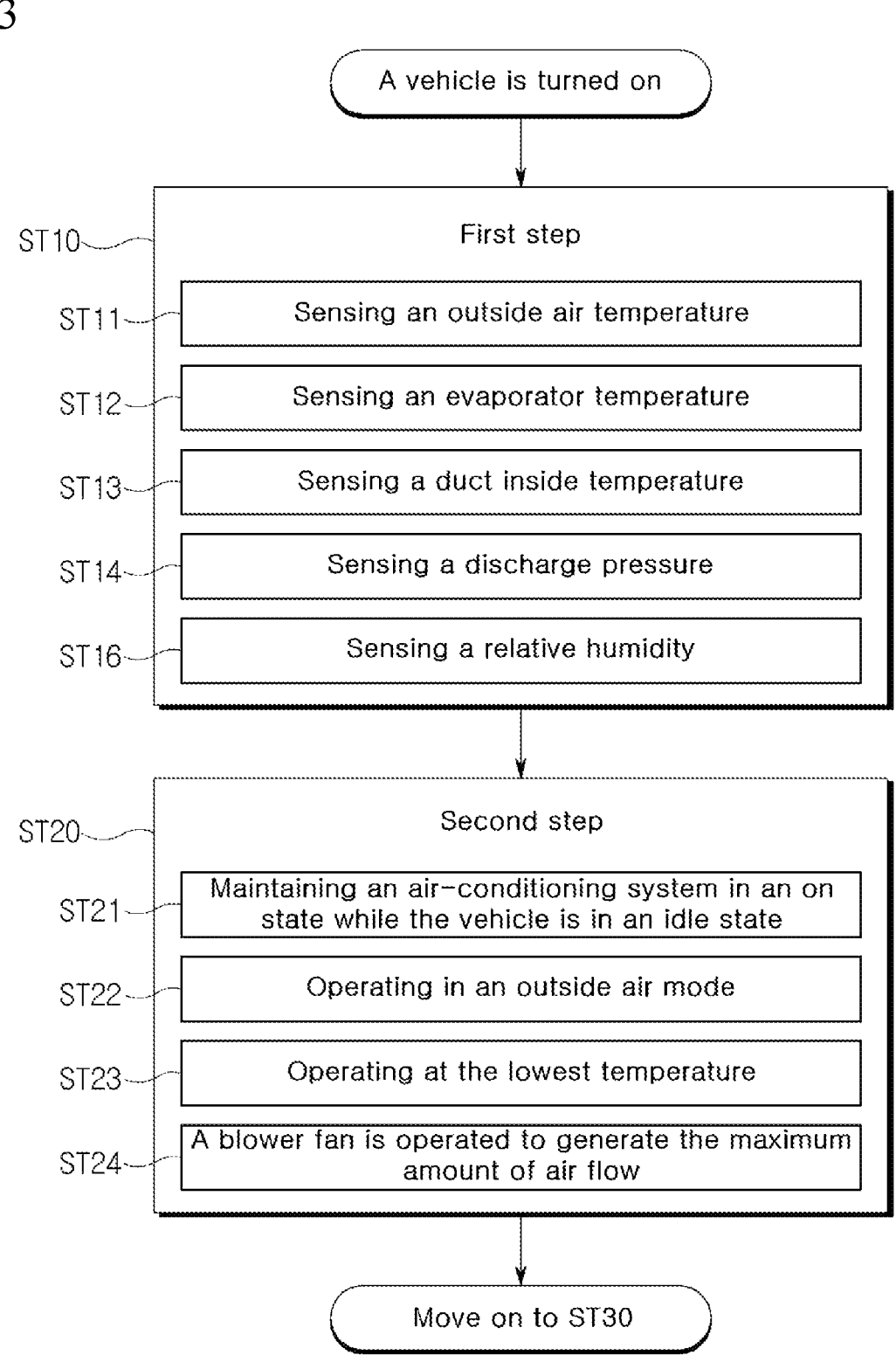
FIG. 3 is a flowchart illustrating detailed configuration of a second to third steps in the first embodiment of the present disclosure.

Referring to FIGS. 2 to 3, the present embodiment includes a first step ST10 for performing a state measurement to determine a refrigerant amount state of a compressor provided in an air-conditioning system after a vehicle is turned on; a second step ST20 for allowing switching to a refrigerant amount determination mode after the first step ST10; a third step ST30 for allowing waiting for 1 hour after the second step ST20; a fourth step ST40 for determining whether an evaporator provided in the air-conditioning system meets a target evaporator temperature Evap T after the third step ST30; and a fifth step ST50 for determining whether a predetermined target deviation temperature per outside air temperature is met after the fourth step ST40, and whether the refrigerant amount of the compressor is normal is determined through the fourth step ST40 or the fifth step ST50.

In the present embodiment, a basic state measurement on the air-conditioning system is performed through the first step ST10 after the vehicle is turned on, in order to sense a slight insufficiency of the refrigerant amount, which is 10% or less, in an assumption that the entire refrigerant amount of the compressor is 100%, thereby increasing accuracy in determining a state of the refrigerant amount insufficiency compared with that of the prior art.

For example, the first embodiment may further include outside air temperature sensing step ST11 for sensing a temperature state of outside air of the vehicle after the vehicle is turned on; evaporator temperature sensing step ST12 for sensing a temperature state of the evaporator; and duct inside temperature sensing step ST13 for sensing a temperature state of an inside of a duct positioned at an outlet side of the evaporator.

The outside air temperature state sensing ST11 is an important variable in determining whether the refrigerant amount in the normal state is maintained in the compressor according to the outside air temperature.

The evaporator temperature sensing step ST12 is used for determining the current temperature of the evaporator by sensing a surface temperature of the evaporator. The current state is a state before an air-conditioner, which is a constituent of the air-conditioning system, is turned on.

In addition, the first embodiment further includes the duct inside temperature sensing step ST13 for sensing a temperature state of an inside of a duct positioned at the outlet side of the evaporator.

The duct is positioned at the outlet side at which the evaporator is installed, and the location is a point to which the cooled air which has exchanged heat while flowing through the evaporator is discharged, therefore, sensing the temperature at this location may allow determining the state of the refrigerant insufficiency precisely, thereby the accuracy may be improved.

The first step ST10 may further include a discharge pressure sensing step ST14 for sensing a discharge pressure of the compressor. Sensing the discharge pressure allows sensing a precise pressure value due to a pressure gap before and after the operation, since a static pressure is measured when the operation of the pressure is stopped, and a high discharge pressure according to discharge of the refrigerant is measured after the operation of the compressor is started.

As such, the present embodiment may precisely sense the outside air temperature of the vehicle, the surface temperature of the evaporator, and the inside temperature of the duct in terms of numeric values, thereby improving accuracy in determining the refrigerant amount of the compressor.

After the above-described first step ST10, the second step ST20 according to the present embodiment may include on-state maintaining step ST21 for maintaining the air-conditioning system in an on state while maintaining the vehicle in an idle state; outside air mode operating step ST22 for operating the air-conditioning system in an outside air mode; and lowest temperature operating step ST23 for operating the air-conditioning system at a lowest temperature.

The reason why the vehicle is maintained to be in an idle state ST20 is to determine the refrigerant amount of the compressor precisely in a state in which the traveling is not performed, and thus the occurrence of the load is minimized in the vehicle, and a stable state is maintained.

In addition, the air-conditioning system is switched to an on-state (ST21), and as the compressor is operated, the air-conditioning system is operated in the outside air mode (ST22). The reason why the air-conditioning system is operated in the outside air mode is that when introducing the outside air rather than introducing the air of the vehicle interior, it is possible to precisely determine presence of any leakage in the compressor arisen because of the refrigerant insufficiency. For example, since the vehicle interior may be maintained in a state in which a temperature is relatively lower or higher than the outside air temperature, it is possible to obtain precise data when introducing the outside air into the air-conditioning system, rather than introducing the air of the vehicle interior thereinto.

Further, the air-conditioning system is automatically set to a lowest temperature and is operated (ST23), and as a blower fan is operated to generate the maximum amount of air flow toward the evaporator, the determination of the refrigerant amount is performed (ST24).

The reason why the air-conditioning system is set to the lowest temperature is to obtain more precise data than that obtained when setting the air-conditioning system to a reference value achieved based on the temperature change of the evaporator, and it is more advantageous to determine an insufficiency state of the refrigerant when setting the lowest temperature as the reference temperature of measurement, than setting a specific temperature as the reference temperature of measurement.

In addition, when the blower fan is operated to generate the maximum amount of air flow (ST24), the operability and responsiveness of the evaporator is achieved faster, therefore, it may be advantageous to precisely determine the refrigerant insufficiency in the compressor.

In the present embodiment, after the second step (ST20), a third step (ST30) is performed, and the third step (ST30) allows the compressor to operate for 1 hour.

The 1 hour is an example, and the time may be 5 minutes or equal to and less than 5 minutes, and may be changed without being limited to the described 1 hour. The 1 hour is a time during which the stabilization is achieved in case the compressor is normally operated with 100% of the refrigerant amount. If the compressor lacks the refrigerant amount by as little as approximately 10% or as great as 50% or more, the operation state shows a definite difference after elapse of 1 hour, thereby the relative comparison can be easily performed.

In the present embodiment, relative humidity is sensed so as to determine the refrigerant amount precisely (ST16). The reason why the relative humidity is sensed is to calculate a more precise value together with the temperature value.

In the present embodiment, the fourth step ST40 after the third step ST30 serves as an important variable in determining whether the state of the refrigerant amount of the compressor is normal or abnormal.

For example, the target evaporator temperature Evap T after the elapse of 1 hour is a temperature at which thermal equilibrium is achieved as the evaporator exchanges heat with the outside air. The target evaporator temperature Evap T is fine-grained in terms of numeric values in a unit of 1% or 0.1% in a section at which the refrigerant amount is 100% to N % and is made into logic, thereby the target evaporator temperature Evap T is accurately calculated when the refrigerant amount of the compressor is 100%.

In addition, in case the refrigerant amount of the compressor is 80%, 70%, or 50%, rather than 100%, it is possible to determine the remaining refrigerant amount precisely, resulting in improved accuracy.

The target evaporator temperature Evap T may change according to the outside air temperature, and in the present embodiment, the outside air temperature is fine-grained in terms of numeric values in a unit of 1 degree, 0.5 degree, or 0.1 degree, and is made into logic, therefore, the refrigerant amount of the compressor can be precisely determined.

The target evaporator temperature Evap T is a temperature that is measured when the refrigerant amount of the compressor is 100%, therefore, if the refrigerant amount of the compressor is insufficient, the temperature data measured as numeric values is changed, and the evaporator temperature is measured to be different from the predetermined target evaporator temperature Evap T.

Consequently, in the fourth step ST40, it may be possible to estimate the current remaining refrigerant amount using the data sensed as the target evaporator temperature Evap T.

For example, when the target evaporator temperature Evap T is lower than the outside air temperature, it is determined that the refrigerant amount is normal. When the outside air temperature is 30 degrees, the target evaporator temperature Evap T is surely lower than the outside air temperature, however, when the target evaporator temperature Evap T is higher than the outside air temperature, that falls under a condition at which the refrigerant amount is insufficient.

For example, the fourth step ST40 may be expressed as an equation below.

$$\text{Evap } T \le A$$

Here, Evap T means the target evaporator temperature, and A means the outside air temperature.

In the fifth step ST50 according to the present embodiment, when the temperature value obtained by deducting the target evaporator temperature Evap T from the duct inside temperature Duct T of a duct positioned at the outlet side of the evaporator is maintained in a range of a target deviation temperature per outside air temperature, it is determined that the refrigerant amount is normal.

When the refrigerant amount of the compressor is insufficient, the amount of the refrigerant which phase-changes in the evaporator is reduced, thus the amounts of absorbed heat is also reduced, and accordingly, the duct inside temperature Duct T has a relatively higher temperature deviation than that of a case in which the refrigerant amount of the compressor is 100%.

In particular, in case the refrigerant amount is insufficient by 1% or N %, which is a slight amount, the data difference sensed because of the difference in the amounts of absorbed heat occurs, therefore, it is possible to provide more precise determination.

For example, when the refrigerant amount is 100%, the weight is maintained as 550 g, and when the refrigerant amount is 80%, the weight is maintained as 440 g, therefore, there occurs a relative difference in the amounts of generated heat according to the respective refrigerant weight.

According to the present embodiment, it is possible to determine a state of the refrigerant amount in addition to the data sensed from the target evaporator temperature Evap T by comparing the duct inside air temperature Duct T with 100%, which is a normal refrigerant amount of the compressor, thereby determining a state of whether the current refrigerant amount of the compressor is insufficient.

The target deviation temperature per outside air temperature is fine-grained in terms of numeric values in a unit of 1 degree or 0.1 degree and is made into logic, and when comparing the target deviation temperature per outside air temperature with a temperature value obtained by deducting the target evaporator temperature Evap T from the duct inside temperature Duct T, it is determined that the refrigerant amount is normal if the target deviation temperature per outside air temperature is maintained in a range of the target deviation temperature per outside air temperature, and is determined to be abnormal, in which the refrigerant amount is insufficient, if the target deviation temperature per outside air temperature differs from the range of the target deviation temperature per outside air temperature.

For example, the fifth step ST50 may be expressed as an equation below.

$$0 \le \text{Duct } T - \text{Evap } T \le B$$

Here, Duct T means the duct inside temperature, Evap T means the target evaporator temperature, and B means the temperature deviation per outside air temperature.

The present embodiment may further include determining whether a discharge pressure meets a value in a range of a discharge pressure per outside air temperature (ST60) after the fifth step ST50. In the determining whether a discharge pressure meets a value in a range of a discharge pressure per outside air temperature (ST60), when the discharge pressure is maintained in a range of first to second target discharge pressures, it is determined that a refrigerant amount is normal.

For example, when the compressor is operated with the refrigerant amount by 100% at the outside air temperature of 35 degrees, the discharge pressure is maintained between 190 psi and 200 psi, therefore, if the above data is set in terms of numeric values and is compared with one another, it may be possible to determine whether the refrigerant amount of the compressor is insufficient.

$$C1 \le APT \le C2$$

Here, APT means the discharge pressure, and C1 and C2 mean values of a range of the discharge pressure. For example, when the outside air temperature is 30 degrees, the discharge pressure is maintained between 180 psi and 190 psi, and when the outside air temperature is 25 degrees, the discharge pressure is maintained between 170 psi and 180 psi.

According to the present embodiment, it is possible to precisely determine whether the refrigerant amount is insufficient by applying the present embodiment to a mechanical compressor to which the method for controlling a vehicle air-conditioning system is applied.

In addition, in the present embodiment, when the above-described fourth to sixth steps ST40, ST50 and ST60 are all met, it is determined that the current refrigerant amount of the compressor is normal (ST70), and when one among the fourth step ST40 and the sixth step ST60 is not met, it is determined that the current refrigerant amount of the compressor is insufficient, and thus, abnormal (ST80).

Hereinafter, the method for controlling a vehicle air-conditioning system according to a second embodiment will be described with reference to the accompanying drawings.

Figure 4:
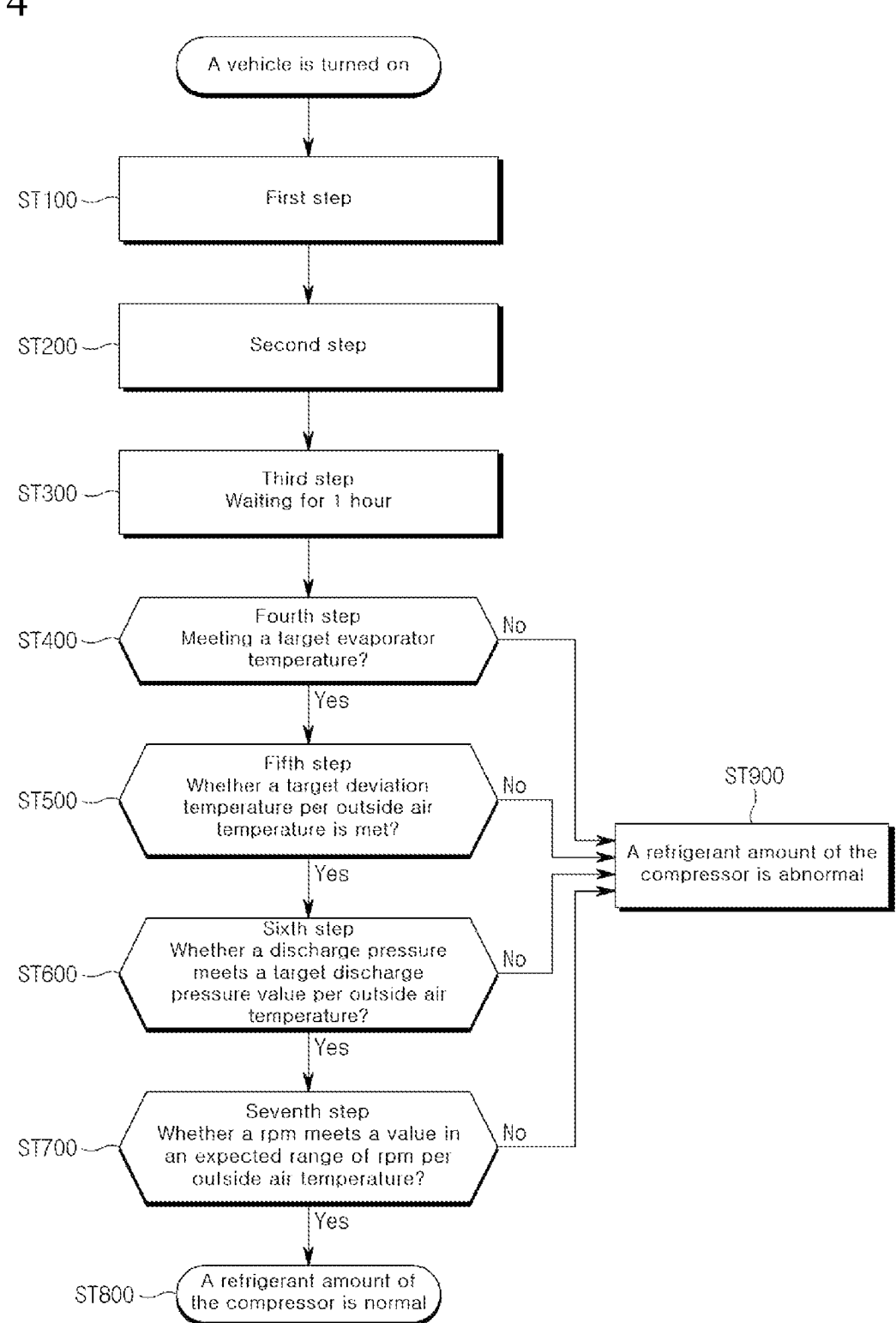
FIG. 4 is a flowchart illustrating a method for controlling a method for controlling a vehicle air-conditioning system according to a second embodiment of the present disclosure.
Figure 5:
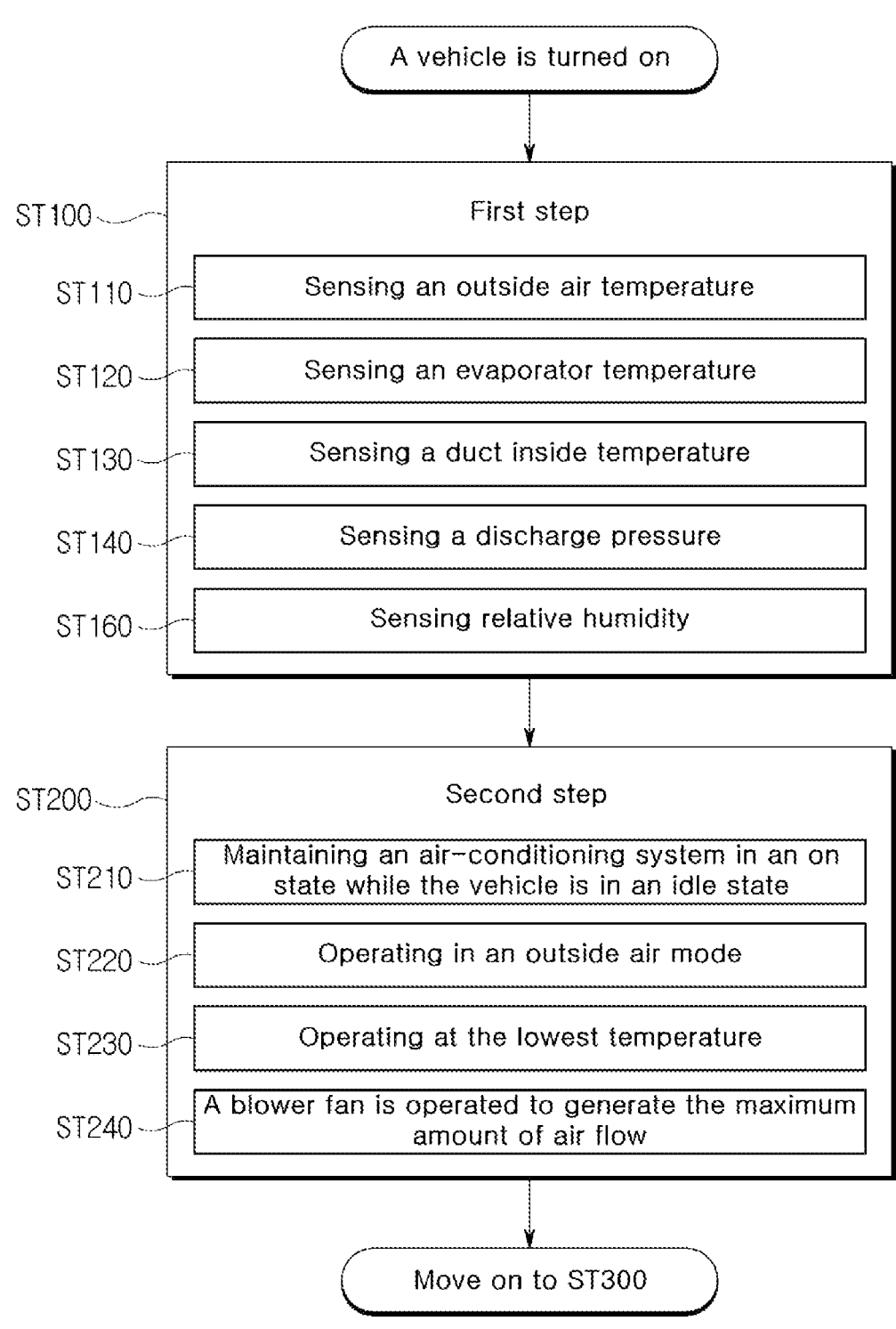
FIG. 5 is a flowchart illustrating detailed configuration of a second to third steps in the second embodiment of the present disclosure.

Referring to FIGS. 4 and 5, the present embodiments includes a first step ST100 for performing a state measurement to determine a refrigerant amount state of a compressor provided in an air-conditioning system after a vehicle is turned on; a second step ST200 for allowing switching to a refrigerant amount determination mode after the first step ST100; a third step ST300 for allowing waiting for 1 hour after the second step ST200; a fourth step ST400 for determining whether an evaporator provided in the air-conditioning system meets a target evaporator temperature Evap T after the third step ST300; a fifth step ST500 for determining whether a predetermined target deviation temperature per outside air temperature is met after the fourth step ST400, a sixth step ST600 for determining whether a discharge pressure meets a target discharge pressure value per outside air temperature after the fifth step ST500; and a seventh step ST700 for determining whether a rpm of the compressor meets a value in an expected range of rpm per outside air temperature after the sixth step ST600, and whether the refrigerant amount of the compressor is normal is determined through the fourth step, the fifth step, the sixth step, or the seventh step.

For example, the first step ST100 further includes: outside air temperature sensing step ST110 for sensing a temperature state of outside air of the vehicle after the vehicle is turned on; evaporator temperature sensing step ST120 for sensing a temperature state of the evaporator; duct inside temperature sensing step ST130 for sensing a temperature state of an inside of a duct positioned at an outlet side of the evaporator; discharge pressure sensing step ST140 for sensing a discharge pressure state of the compressor; and rpm sensing step ST150 for sensing a rpm of the compressor.

The outside air temperature sensing step ST110 for sensing a temperature state of outside air of the vehicle is an important variable in determining whether the refrigerant amount of the compressor is maintained to be normal according to the outside air temperature.

The evaporator temperature sensing step ST120 is used in determining the current temperature of the evaporator by sensing a surface temperature of the evaporator. The current state corresponds to a state before the air-conditioner, which is a constituent of the air-conditioning system, is turned on.

In addition, the duct inside temperature sensing step ST130 for sensing a temperature state of an inside of a duct positioned at an outlet side of the evaporator is further included.

The duct is positioned at the outlet side at which the evaporator is installed, and the location is a point to which the cooled air which has exchanged heat while flowing through the evaporator is discharged, therefore, sensing the temperature at this location may allow determining the state of the refrigerant insufficiency precisely, thereby improving the accuracy.

Sensing the discharge pressure allows sensing a precise pressure value due to a pressure gap between before and after the operation, since a static pressure is measured when the operation of the pressure is stopped, and a high discharge pressure according to discharge of the refrigerant is measured after the operation of the compressor is started (ST140).

In the present embodiment, relative humidity is sensed so as to determine the refrigerant amount precisely (ST160). The reason why the relative humidity is sensed is to calculate a more precise value together with the temperature value.

As described above, the present embodiment precisely senses the outside air temperature of the vehicle, the surface temperature of the evaporator, the discharge pressure of the compressor, the rpm data of the compressor, and the relative humidity data in terms of numeric values, thereby improving the accuracy in determining the refrigerant amount of the compressor.

The second step ST200 according to the present embodiment may include on-state maintaining step ST210 for maintaining the air-conditioning system in an on state while maintaining the vehicle in an idle state after the first step ST100; outside air mode operating step ST220 for operating the air-conditioning system in an outside air mode; and lowest temperature operating step ST230 for operating the air-conditioning system at a lowest temperature.

The reason why the vehicle is maintained to be in an idle state ST200 is to determine the refrigerant amount of the compressor precisely in a state in which the occurrence of the load is minimized in the vehicle, and a stable state is maintained.

In addition, the air-conditioning system is switched to an on-state (ST210), and as the compressor is operated, the air-conditioning system is operated in the outside air mode (ST220). The reason why the air-conditioning system is operated in the outside air mode is that it is possible to precisely determine presence of any leakage in the compressor arisen because of the refrigerant insufficiency when introducing the outside air rather than introducing the air of the vehicle interior.

For example, since the vehicle interior may be maintained in a state in which a temperature is relatively lower or higher than the outside air temperature, it is possible to obtain precise data when introducing the outside air into the air-conditioning system, rather than introducing the air of the vehicle interior.

Further, the air-conditioning system is automatically set to a lowest temperature and is operated (ST230), and as a blower fan is operated to generate the maximum amount of air flow toward the evaporator, the determination of the refrigerant amount is performed (ST240).

The reason why the air-conditioning system is set to the lowest temperature is to obtain more precise data than that obtained when setting the air-conditioning system to a reference value achieved based on the temperature change of the evaporator, and it is more advantageous to determine an insufficiency state of the refrigerant when setting the lowest temperature as the reference temperature of measurement, than setting a specific temperature as the reference temperature of measurement.

In addition, when the blower fan is operated to generate the maximum amount of air flow (ST240), the operability and responsiveness of the evaporator is achieved faster, therefore, it may be more advantageous to precisely determine the refrigerant insufficiency of the compressor.

In the present embodiment, after the second step (ST200), a third step (ST300) is performed, and the third step (ST300) allows the compressor to operate for 1 hour.

The 1 hour is an example, and the time may be 5 minutes or equal to and less than 5 minutes, and may be changed without limiting the time to the described 1 hour. The 1 hour is a time during which the stabilization is achieved in case the compressor is normally operated with 100% of the refrigerant amount. If the compressor lacks the refrigerant amount by as little as approximately 10% or as great as 50% or more, the operation state shows a definite difference after elapse of 1 hour, thereby the relative comparison can be easily performed.

In the present embodiment, the fourth step ST400 after the third step ST300 serves as an important variable in determining whether the state of the refrigerant amount of the compressor is normal or abnormal.

For example, the target evaporator temperature Evap T after the elapse of 1 hour is a temperature at which thermal equilibrium is achieved as the evaporator exchanges heat with the outside air. The target evaporator temperature Evap T is fine-grained in terms of numeric values in a unit of 1% or 0.1% in a section at which the refrigerant amount is 100% to 0% and is made into logic, thereby the target evaporator temperature Evap T is accurately calculated when the refrigerant amount of the compressor is 100%.

In addition, in case the refrigerant amount of the compressor is 80%, 70%, or 50%, rather than 100%, it is possible to determine the remaining refrigerant amount precisely, resulting in the improved accuracy.

The target evaporator temperature Evap T may change according to the outside air temperature, and in the present embodiment, the outside air temperature is fine-grained in terms of numeric values in a unit of 1 degree, 0.5 degree, or 0.1 degree, and made into logic, therefore, the refrigerant amount of the compressor can be precisely determined.

The target evaporator temperature Evap T is a temperature that is measured when the refrigerant amount of the compressor is 100%, therefore, if the refrigerant amount of the compressor is insufficient, the temperature data measured as numeric is changed, and the evaporator temperature is measured to be different from the predetermined target evaporator temperature Evap T.

Consequently, in the fourth step ST400, it may be possible to estimate the current remaining refrigerant amount using the data sensed to be the target evaporator temperature Evap T.

For example, when the target evaporator temperature Evap T is lower than the outside air temperature, it is determined that the refrigerant amount is normal. When the outside air temperature is 30 degrees, the target evaporator temperature Evap T is surely lower than the outside air temperature, however, when the target evaporator temperature Evap T is higher than the outside air temperature, that falls under a condition at which the refrigerant amount is insufficient.

For example, the fourth step ST400 may be expressed as an equation below.

$$Evap\ T \le A$$

Here, Evap T means the target evaporator temperature, and A means the outside air temperature.

In the fifth step ST500 according to the present embodiment, when the temperature value obtained by deducting the target evaporator temperature Evap T from the duct inside temperature Duct T of a duct positioned at the outlet side of the evaporator is maintained in a range lower than a target deviation temperature per outside air temperature, it is determined that the refrigerant amount is normal.

When the refrigerant amount of the compressor is insufficient, the amount of the refrigerant which phase-changes in the evaporator is reduced, thus the amounts of absorbed heat is also reduced, and accordingly, the duct inside temperature Duct T has a relatively higher temperature deviation than that of a case in which the refrigerant amount of the compressor is 100%.

In particular, in case the refrigerant amount by 1% or N %, which is a slight amount, is insufficient in the compressor, the data difference sensed because of the difference in the amounts of absorbed heat occurs, therefore, it is possible to provide more precise determination.

According to the present embodiment, it is possible to determine a state of the refrigerant amount in addition to the data sensed from the target evaporator temperature Evap T by comparing the duct inside air temperature Duct T with 100%, which is a normal refrigerant amount of the compressor, thereby determining a state of whether the current refrigerant amount of the compressor is insufficient.

The target deviation temperature per outside air temperature is fine-grained in terms of numeric values in a unit of 1 degree or 0.1 degree and is made into logic, and when comparing the target deviation temperature per outside air temperature with a temperature value obtained by deducting the target evaporator temperature Evap T from the duct inside temperature Duct T, it is determined that the refrigerant amount is normal if the target deviation temperature per outside air temperature is maintained in a range of the target deviation temperature per outside air temperature, and is determined to be abnormal, in which the refrigerant amount is insufficient, if the target deviation temperature per outside air temperature differs from the range of the target deviation temperature per outside air temperature.

For example, the fifth step ST500 may be expressed as an equation below.

$$0 \le Duct\ T - Evap\ T \le B$$

Here, Duct T means the duct inside temperature, Evap T means the target evaporator temperature, and B means the temperature deviation per outside air temperature.

In the determining whether a discharge pressure meets a value in a range of a discharge pressure per outside air temperature (ST600), when the discharge pressure is maintained in a range of first to second target discharge pressures, it is determined that the refrigerant amount is normal.

For example, when the compressor is operated with the refrigerant amount by 100% at the outside air temperature of 30 degrees, the discharge pressure is maintained to be a specific pressure according to various outside air temperatures, therefore, if the above data is set in terms of numeric values and is compared with one another, it may be possible to determine whether the refrigerant amount of the compressor is insufficient.

$$C1 \le APT \le C2$$

Here, APT means the discharge pressure, and C1 and C2 mean values of a range of the discharge pressure.

In the seventh step ST700, when a rpm of the compressor meets first to second expected rpm, it is determined that a refrigerant amount is normal, and if the above data is set in terms of numeric values and is compared with one another, it may be possible to determine whether the refrigerant amount of the compressor is insufficient.

$$D1 \le RPM \le D2$$

Here, the rpm means revolutions per minute of the compressor, and D1 and D2 mean the expected rpms.

In the present embodiment, when the above-described fourth to seventh steps ST400, ST500, ST600 and ST700 are all met, it is determined that the current refrigerant amount of the compressor is normal (ST800), and when one among the fourth to seventh steps ST400, ST500, ST600 and ST700 is not met, it is determined that the current refrigerant amount of the compressor is insufficient, and thus, abnormal (ST900). Therefore, unlike the prior art, the present embodiment may precisely sense changes in the refrigerant amount of the compressor, thereby preventing any problem causing damage to an expensive compressor in advance.

The present embodiment may apply the method for controlling the vehicle air-conditioning system described above to the electric compressor, thereby improving the stability of the electric compressor, which is expensive, and monitoring the refrigerant amount.

A third embodiment of the present disclosure will be described with reference to the accompanying drawings.

Figure 6:
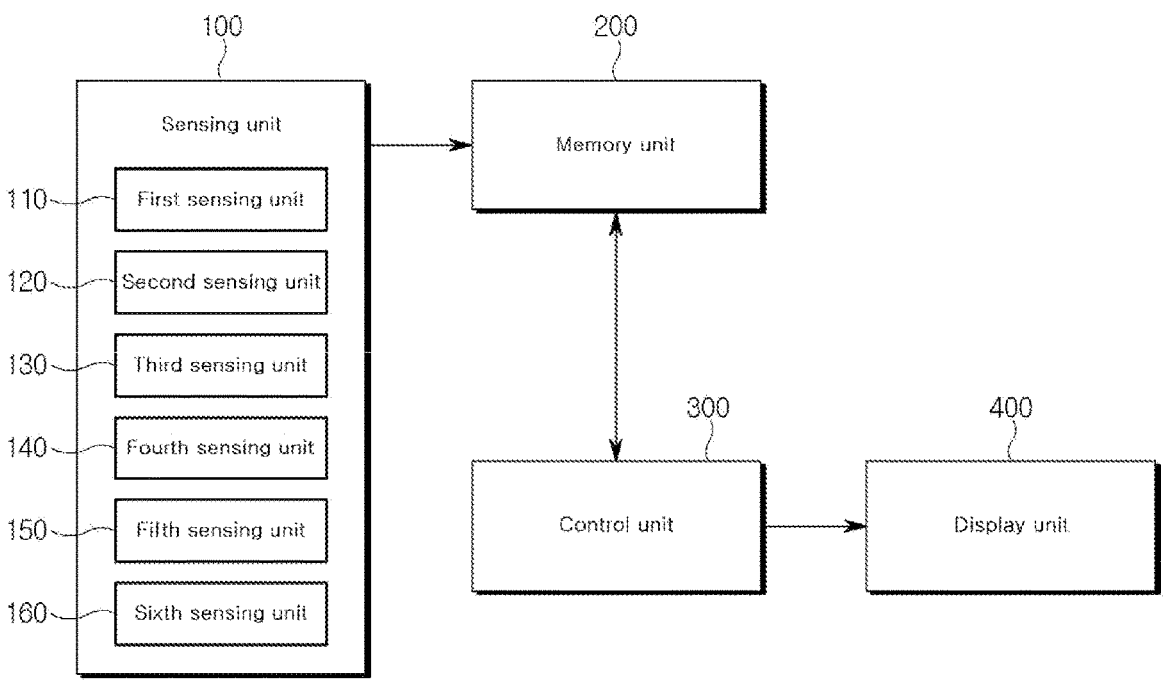
FIG. 6 is a flowchart illustrating a configuration of a compressor according to a third embodiment of the present disclosure.

According to FIG. 6, the present embodiment provides a vehicle compressor, which includes a sensing unit 100 configured to sense whether a refrigerant of a compressor provided in a vehicle air-conditioning system is maintained to be normal; a memory unit 200 configured to receive and store information sensed by the sensing unit 100; a control unit 300 configured to determine whether a current refrigerant amount of the compressor is normal or abnormal by switching the air-conditioning system to a refrigerant amount determination mode in association with the memory unit 200; and a display unit 400 configured to display that a refrigerant amount of the compressor is abnormal in association with the control unit 300 when a refrigerant amount of the compressor is abnormal.

The sensing unit 100 includes: a first sensing unit 110 configured to sense an outside air temperature of the vehicle; a second sensing unit 120 configured to sense a temperature of an evaporator; a third sensing unit 130 configured to sense an inside temperature of a duct positioned at an outlet side of the evaporator; a fourth sensing unit 140 configured to sense a discharge pressure of the compressor; a fifth sensing unit 150 configured to sense a rpm of the compressor; and a sixth sensing unit 160 configured to sense relative humidity outside the vehicle.

The information sensed by the first to sixth sensing units 110, 120, 130, 140, 150, and 160 is first stored and recorded in the memory unit 200, and is transmitted to the control unit 300 to be compared with a predetermined value so as to determine whether the refrigerant amount is insufficient.

In particular, since the control unit 300 receives relative humidity information sensed by the sixth sensing unit 160 so that the control unit 300 can precisely determine the state of refrigerant insufficiency of the compressor, the present embodiment may obtain the temperature information sensed by the first sensing unit 110 and precisely determine whether the current refrigerant amount of the compressor is normal or abnormal.

In the same manner as the first to second embodiments described above, the control unit 300 precisely determines refrigerant insufficiency of the compressor in the method described in the second to seventh steps, and then controls the display unit 400 to generate an air mark only when the refrigerant amount of the compressor is abnormal.

The setting of the display unit 400 may be variously changed, and may be set to generate notifications to an operator, or to generate notifications only when scanning is performed using an additional scanner during a repair process.

Although exemplary embodiments of the present disclosure were described above, the present disclosure may be changed and modified in various ways by those skilled in the art without departing from the spirit of the present invention described in claims by replacing, changing, or removing the components, which will be included in the scope of the present invention.

The embodiments of the present disclosure may be applied to compressors of vehicles and may precisely sense changes in the refrigerant amount of the compressors.

The invention claimed is:

1. A method for controlling a vehicle air-conditioning system, the method comprising:
   a first step of sensing one or more temperatures or pressures to determine a refrigerant amount state of a compressor provided in an air-conditioning system after a vehicle is turned on;
   a second step for switching to a refrigerant amount determination mode after the first step;
   a third step for waiting for 1 hour after the second step;
   a fourth step for determining whether an evaporator provided in the air-conditioning system meets a target evaporator temperature Evap T after the third step; and a fifth step for determining whether a predetermined target deviation temperature of an outside air temperature is met after the fourth step, wherein whether the refrigerant amount state of the compressor is normal is determined through the fourth step or the fifth step,
wherein the second step comprises:
   an on-state maintaining step for maintaining the air-conditioning system in an on state while maintaining the vehicle in an idle state;
   an outside air mode operating step for operating the air-conditioning system in an outside air mode;
   a lowest temperature operating step for operating the air-conditioning system at a lowest temperature; and
   a blower fan operating step for operating a blower fan provided in the air-conditioning system to generate a maximum amount of air flow.

2. The method of claim 1, wherein the first step further comprises:
   an outside air temperature sensing step for sensing a temperature state of an outside air of the vehicle;
   an evaporator temperature sensing step for sensing a temperature state of the evaporator; and
   a duct inside temperature sensing step for sensing a temperature state of an inside of a duct positioned at an outlet side of the evaporator.

3. The method of claim 2, wherein the first step further comprises:
   a discharge pressure sensing step for sensing a discharge pressure of the compressor.

4. The method of claim 1, wherein the 1 hour of the third step corresponds to a time taken for stabilizing operation of the compressor to have a refrigerant amount in a normal state.

5. The method of claim 1, wherein when the target evaporator temperature Evap T is lower than the outside air temperature, it is determined that a refrigerant amount is normal.

6. The method of claim 1, wherein in the fifth step, when a temperature value obtained by deducting the target evaporator temperature Evap T from an inside temperature of a duct Duct T positioned at an outlet side of the evaporator is maintained in a range of the target deviation temperature of the outside air temperature, it is determined that a refrigerant amount is normal.

7. The method of claim 1, further comprising:
   determining whether a discharge pressure meets a value in a range of the discharge pressure per the outside air temperature after the fifth step.

8. The method of claim 7, wherein in the determining whether the discharge pressure meets the value in the range of the discharge pressure per the outside air temperature, when the discharge pressure is maintained in a range of a first target discharge pressure to a second target discharge pressure, it is determined that a refrigerant amount is normal.

9. The method of claim 1, wherein when the fourth to the fifth steps are both met, it is determined that a current refrigerant amount of the compressor is normal.

\* \* \* \* \*